United States Patent
Umemoto et al.

(10) Patent No.: US 9,798,289 B2
(45) Date of Patent: Oct. 24, 2017

(54) IMAGE FORMING APPARATUS

(71) Applicant: Konica Minolta, Inc., Chiyoda-ku, Tokyo (JP)

(72) Inventors: Hiroaki Umemoto, Neyagawa (JP); Shigeru Tashiro, Toyokawa (JP); Masayuki Satou, Toyohashi (JP); Masahiro Yamaguchi, Toyokawa (JP); Shoichi Yoshikawa, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/854,405

(22) Filed: Sep. 15, 2015

(65) Prior Publication Data

US 2016/0077488 A1    Mar. 17, 2016

(30) Foreign Application Priority Data

Sep. 16, 2014  (JP) .................................. 2014-187707

(51) Int. Cl.
*G03G 21/20* (2006.01)
*B01D 46/00* (2006.01)

(52) U.S. Cl.
CPC ....... *G03G 21/206* (2013.01); *B01D 46/0045* (2013.01)

(58) Field of Classification Search
None
See application file for complete search history.

(56) References Cited

U.S. PATENT DOCUMENTS

2011/0211860 A1    9/2011   Shimoyama et al.

FOREIGN PATENT DOCUMENTS

| JP | H0519582 A | 1/1993 |
|---|---|---|
| JP | H05313456 A | 11/1993 |
| JP | 2000293076 A | 10/2000 |
| JP | 2002310469 A | 10/2002 |
| JP | 2006215307 A | 8/2006 |
| JP | 2011180236 A | 9/2011 |
| JP | 2012128013 A * | 7/2012 |
| JP | 2013190762 A | 9/2013 |

OTHER PUBLICATIONS

JP 2012128013 English machine translation, Aoki, Jul. 5, 2012.*
Japanese Office Action corresponding to Application No. 2014-187707; Mailed: Oct. 25, 2016, with English translation.
JPO Notice of Reasons for Refusal corresponding to JP Application No. 2014-187707; dated Feb. 14, 2017.

\* cited by examiner

*Primary Examiner* — Thomas Giampaolo, II
(74) *Attorney, Agent, or Firm* — Cantor Colburn LLP

(57) ABSTRACT

An image forming apparatus has a function to clean exhaust air from inside and to discharge cleaned air. The image forming apparatus has an exhaust air duct configured to guide internal air to outside, and a cleaning filter configured to clean air passing through the exhaust air duct. A cubic measure of an airflow path in the exhaust air duct during normal operation has a first value, and the cubic measure of the airflow path in the exhaust air duct during operation causing a large amount of harmful matters to be contained in the exhaust air from inside has a second value greater than the first value.

4 Claims, 8 Drawing Sheets

F I G. 1
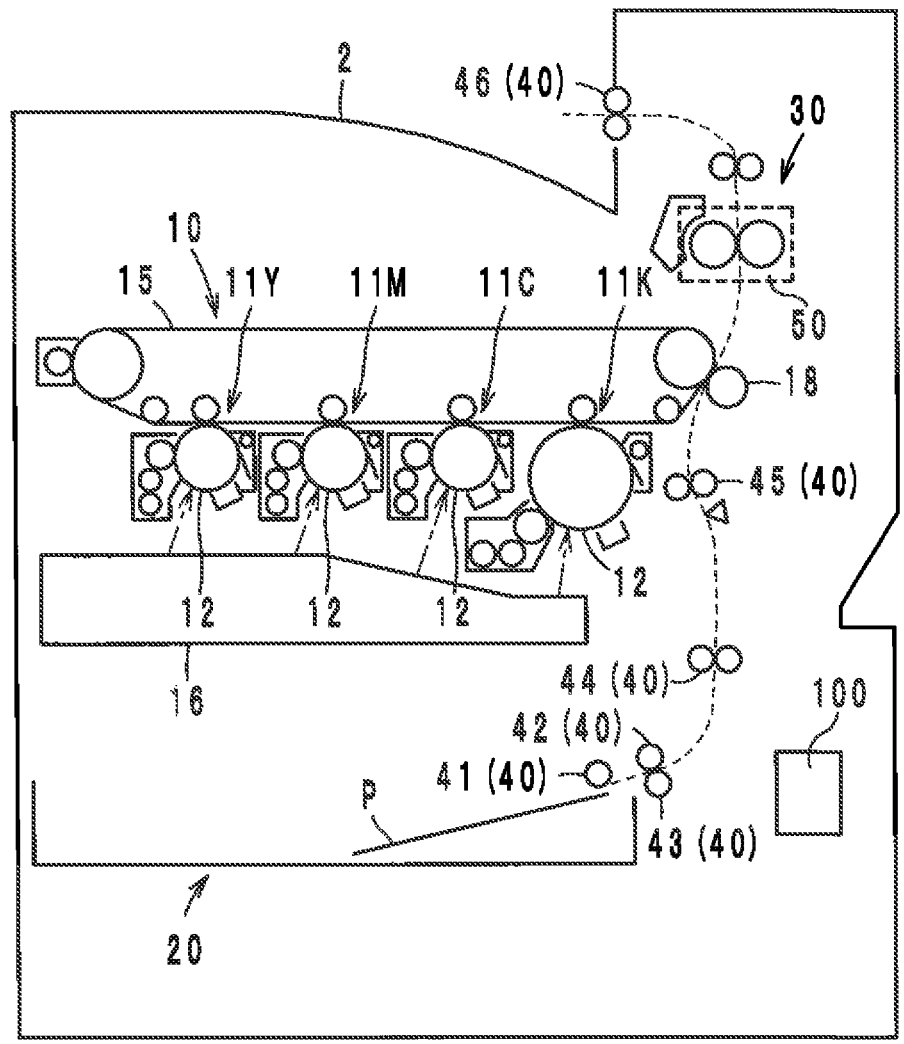
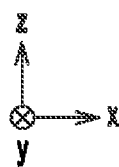

F I G . 7
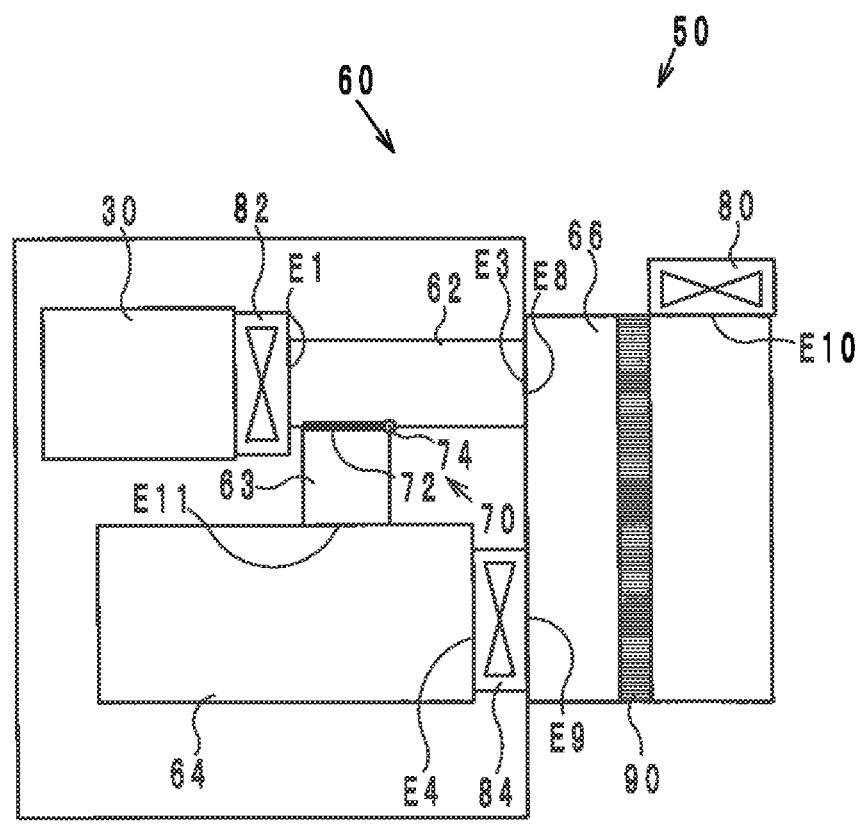

IMAGE FORMING APPARATUS

CROSS REFERENCE TO RELATED APPLICATION

The present invention claims priority under 35 U.S.C. §119 to Japanese Application No. 2014-187707 filed Sep. 16, 2014, the entire content of which is incorporated herein by reference.

BACKGROUND OF THE INVENTION

Field of the Invention

The present invention relates to an image forming apparatus, and more particularly to an image forming apparatus that has a function to clean the exhaust air from the inside of the apparatus and discharges the cleaned air.

Description of Related Art

The exhaust air from an electrophotographic image forming apparatus generally contains harmful matters, such as volatile organic components (VOC), ultrafine particulates (UFP), etc. In an image forming apparatus as disclosed in Japanese Patent Laid-Open Publication No. 2006-215307, a filter serving to trap these harmful matters is provided in an exhaust air duct leading the air inside the apparatus to the outside. In a conventional image forming apparatus of this type, an exhaust fan is also provided, which affects the efficiency of trapping harmful matters in the filter. In the conventional image forming apparatus, when lots of harmful matters are generated, the rotation speed of the exhaust fan is lowered so as to improve the efficiency of trapping harmful matters in the filter.

Lowering the rotation speed of the exhaust fan so as to improve the efficiency of trapping harmful matters in the filter is based on a thought that there is a correlation between the efficiency of trapping harmful matters in a filter and the flow rate of the harmful matters coming into the filter. Specifically, it is considered that the lower the flow rate of harmful matters coming into the filter, that is, the lower the rotation speed of the exhaust fan, the higher the efficiency of trapping the harmful matters in the filter. However, lowering the flow rate of harmful matters coming into the filter creates a risk of leaking the harmful matters from the vicinity of a fixing unit.

SUMMARY OF THE INVENTION

An object of the present invention is to provide an image forming apparatus having a function to clean the exhaust air from the inside of the apparatus and discharge the cleaned air while reducing the risk of leaking harmful matters to the outside of the apparatus.

According to an aspect of the present invention, an image forming apparatus has a function to clean exhaust air from inside and to discharge cleaned air, and the image forming apparatus comprises: an exhaust air duct configured to guide internal air to outside; and a cleaning filter configured to clean air passing through the exhaust air duct, wherein a cubic measure of an airflow path in the exhaust air duct during normal operation has a first value; and the cubic measure of the airflow path in the exhaust air duct during operation causing a large amount of harmful matters to be contained in the exhaust air from inside has a second value greater than the first value.

BRIEF DESCRIPTION OF THE DRAWINGS

FIG. 1 is a schematic view indicating the internal structure of an image forming apparatus according to an embodiment of the present invention.

FIG. 7 is a schematic view of an air cleaning system according to a third modification, indicating a state of normal operation.

DETAILED DESCRIPTION OF THE PREFERRED EMBODIMENTS

Figure 2:
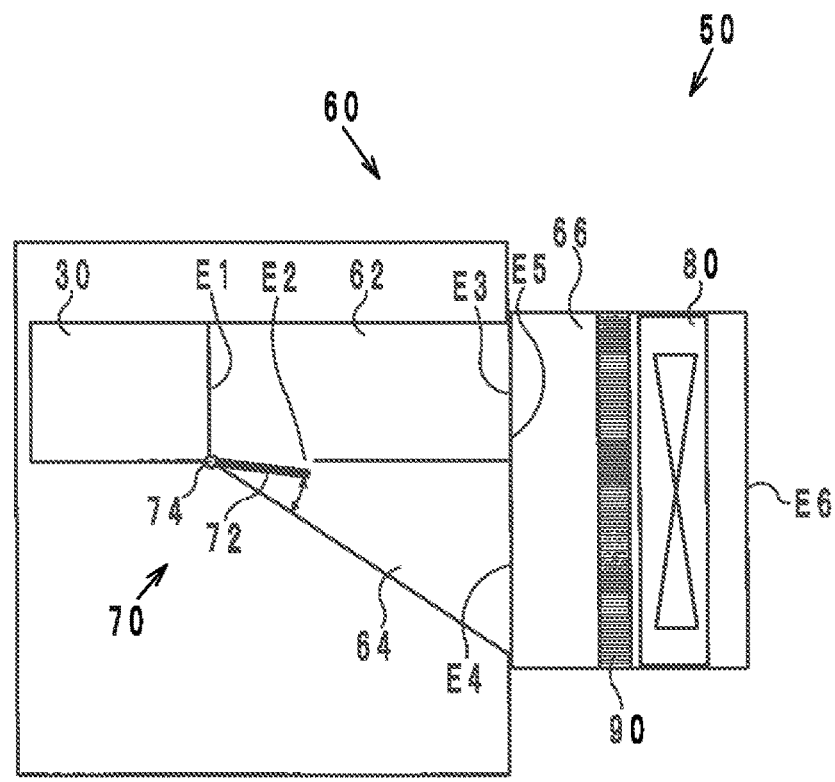
FIG. 2 is a schematic view of an air cleaning system according to an embodiment of the present invention.
Figure 2:
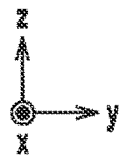

General Structure of Image Forming Apparatus; See FIGS. 1 and 2

An image forming apparatus 1 according to an embodiment is described with reference to the drawings. In the drawings, the same parts and the same members are denoted by the same reference symbols, and repetitions of the same descriptions are avoided.

The image forming apparatus 1 is an electrophotographic color printer. As illustrated in FIG. 1, the image forming apparatus 1 comprises a control unit 100 controlling the parts and the members of the image forming apparatus 1, an image forming section 10, a sheet cassette 20, a fixing device 30, a sheet conveyance system 40 and an air cleaning system 50.

The image forming section 10 includes image forming units 11Y, 11M, 11C and 11K configured to form images in colors of Y (yellow), M (magenta), C (cyan) and K (black), respectively. In each of the image forming units 11Y, 11M, 11C and 11K, a charger, a developing device and other devices are arranged around a photoreceptor drum 12. The image forming section 10 further includes an intermediate transfer belt 15 configured to receive toner images formed in the image forming units 11Y, 11M, 11C and 11K to turn the images into a composite toner image (first transfer), a secondary transfer roller 18 configured to transfer the composite toner image from the intermediate transfer belt 15 to a sheet P (second transfer), and an exposure unit 16 configured to expose the photoreceptor drums 12 with laser beams. The structure and the operation of the image forming section 10 of such a type are well known, and a detailed description thereof is omitted.

The sheet cassette 20 is a box-like case in which sheets P are stacked. The sheet cassette 20 is arranged so as to be drawable from the front side (the front side of the plane of paper of FIG. 1) of the image forming apparatus 1. The presence or non-presence of sheets in the sheet cassette 20 is detected by a sensor (not illustrated in the drawings) provided in the sheet cassette 20. When the sheet cassette 20 is emptied of sheets, the control unit 100 receives a signal from the sensor, and a user interface of the image forming apparatus displays the empty state of the sheet cassette 20.

The sheet conveyance system 40 serves a function to convey a sheet P inside the image forming apparatus. The sheet conveyance system 40 includes a pick-up roller 41, a feed roller 42, a separation roller 43, a pair of feed rollers 44, a pair of timing rollers 45 and a pair of ejection rollers 46. The uppermost sheet P of the stack of sheets in the sheet cassette 20 is picked up by the pick-up roller 41 and fed by the feed roller 42 and the separation roller 43. The sheet P is fed downstream in a sheet feeding direction by the pair of feed rollers 44 to the secondary transfer roller 18 via the pair of timing rollers 45. The toner image on the intermediate transfer belt 15 is transferred to the sheet P by the effect of an electric field applied from the second transfer roller 18. Thereafter, the sheet P is subjected to toner fixation by heat in the fixing device 30 and is ejected by the pair of ejection rollers 46 onto a printed-sheet tray 2 provided on the upper surface of the image forming apparatus 1.

The air cleaning system 50 is configured to clean the exhaust air from the inside of the image forming apparatus 1 and to discharge the cleaned air. A detailed description of the air cleaning system 50 will be given below.

Details of Air Cleaning System; See FIG. 2

The air cleaning system 50 is located to extend from the inside to the back side of the image forming apparatus 1. The air cleaning system 50, as illustrated in FIG. 2, includes an exhaust air duct 60, an on-off valve 70, an exhaust fan 80 and a cleaning filter 90.

The exhaust air duct 60 serves a function to lead the exhaust air from the fixing device 30 to the outside of the image forming apparatus 1. The exhaust air duct 60 includes two air passages 62 and 64 extending to the back side of the image forming apparatus 1, and a junction 66. The air passages 62 and 64 are arranged side by side across a partition wall.

The air passage 62 is a hollow member extending from the fixing device 30 to the back side of the image forming apparatus 1. The air passage 62 has three openings E1 through E3. The opening E1 is made near the fixing device 30. Therefore, the exhaust air from the fixing device 30 flows into the air passage 62 through the openings E1. The opening E2 is made near the opening E1 and at a connection portion to the air passage 64. The opening E2 is openable and closable by the on-off valve 70 as will be described later. The opening E3 is a connection portion to the junction 66.

The air passage 64 is a hollow member branching from the air passage 62 and extending to the back side of the image forming apparatus 1. The air passage 64 has two openings. One of the openings is the opening E2 that is a connection portion to the air passage 62. The other is an opening E4 that is a connection portion to the junction 66.

The junction 66 is a hollow member provided at the back side of the image forming apparatus 1. The junction 66 has two openings. One of the openings is an opening E5 that is connected to both the opening E3 of the air passage 62 and the opening E4 of the air passage 64. The other is an opening E6 through which the exhaust air from the fixing device 30 is finally discharged to the outside of the apparatus 1.

The on-off valve 70 includes a plate 72 and a shaft 74. As mentioned, the on-off valve 70 is provided at the opening E2 of the air passage 62. The plate 72 has the same shape as the opening E2. The plate 72 rotates around the shaft 74 fixed to the exhaust air duct 60. By this rotation of the on-off valve 70, the airflow from the air passage 62 to the air passage 64 is controlled. The on-off valve 70 is rotated by a motor (not illustrated in the drawings) under control of the control unit 100.

The exhaust fan 80 is provided in the junction 66, near the opening E6. The exhaust fan 80 creates airflow from the fixing device 30 to the outside of the apparatus. Therefore, operation of the exhaust fan 80 results in discharge of the exhaust air from the fixing device 30 to the outside of the apparatus.

The cleaning filter 90 is provided in the junction 66, between the opening E5 and the exhaust fan 80. The cleaning filter 90 is a sheet of porous fabric fitted in a rectangular frame, which is called an air filter. The cleaning filter 90 does not necessarily need to be a sheet of porous fabric. The cleaning filter 90 may be pleated or may be made of a material other than porous fabric.

In the air cleaning system 50 having the structure above, the air retention time in the exhaust air duct 60 during heating of the fixing device 30 accompanying emission of a considerable amount of siloxane and other harmful matters (which will be hereinafter referred to as initial burst) is different from the air retention time in the exhaust air duct 60 during normal operation of the fixing device 30 other than initial burst.

During normal operation, the on-off valve 70 is kept closed. Accordingly, the airflow from the fixing device 30 to the outside of the apparatus created by the operation of the exhaust fan 80 passes through the air passage 62 and the junction 66. In this moment, harmful matters contained in the air flowing from the fixing device 30 toward the outside are trapped in the cleaning filter 90 provided in the junction 66. In this case, the air retention time T1 in the airflow path in the exhaust air duct 60 is expressed as $T1=(V1+V2)/Va$, wherein V1 denotes the cubic measure of the air passage 62, V2 denotes the cubic measure of a space of the junction 66 from the opening E5 to the cleaning filter 90, and Va denotes the exhaust air volume per unit time achieved by operation of the exhaust fan 80.

During initial burst, the on-off valve 70 is kept open. Accordingly, the airflow from the fixing device 30 to the outside of the apparatus created by the operation of the exhaust fan 80 passes through the air passages 62, 64 and the junction 66, and in the meantime, harmful matters contained in the air are trapped in the cleaning filter 90. In this case, the air retention time T2 in the airflow path in the exhaust air duct 60 is expressed as $T2=(V1+V2+V3)/Va$, wherein V3 denotes the cubic measure of the air passage 64. Thus, the air retention time T2 during initial burst is longer than the air retention time T1 during normal operation. During initial burst, because of the longer air retention time, the amount of harmful matters coming into the filter 90 is leveled temporally. Accordingly, the peak value of the amount of harmful matters coming into the filter 90 becomes lower, and it is possible to lower the amount of harmful matters discharged from the apparatus. In sum, the trapping efficiency of the filter 90 during initial burst is higher than the trapping efficiency of the filter 90 during normal operation. In this embodiment, initial burst is the condition for opening the on-off valve 70. More specifically, the following control is possible. For example, at the time of power-on of the image forming apparatus 1 or at the time of return from a stand-by state, the on-off valve 70 is opened, and when a predetermined time has elapsed after completion of a heating process of the fixing roller in the fixing device 30, the on-off valve 70 is closed.

Advantageous Effects

In the image forming apparatus 1, as described above, the cubic measure of the airflow path in the exhaust air duct 60 during initial burst is greater than the cubic measure of the airflow path in the exhaust air duct 60 during normal operation. Accordingly, the air retention time in the exhaust air duct 60 during initial burst is longer, and the temporal characteristic of the amount of harmful matters coming into the cleaning filter 90 is leveled, and the peak value of the amount of harmful matters coming into the filter per unit time is lowered. There is a limit on the amount of harmful matters trapped in the cleaning filter 90 per unit time. Therefore, reducing the amount of harmful matters coming into the cleaning filter 90 per unit time, that is, increasing the air retention time in the airflow path in the exhaust air duct 60 results in an improvement of the efficiency of trapping harmful matters in the cleaning filter 90.

Figure 3:
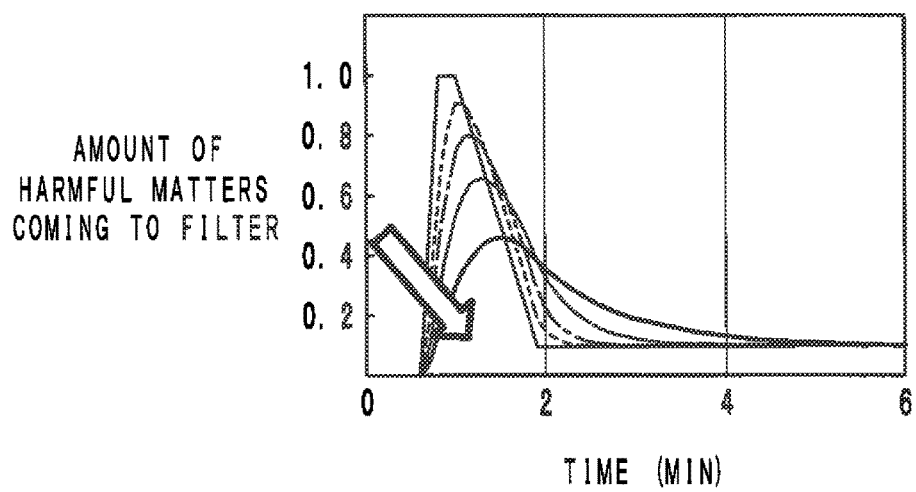
FIG. 3 is graph indicating the relation between the amount of harmful matters that passed through an air cleaning filter per unit time and elapse of time.

The inventors examined the relation between the amount of harmful matters passing through the cleaning filter 90 per unit time as time passes while varying the air retention time in the exhaust air duct 60. FIG. 3 is a graph indicating the results. In FIG. 3, the solid line, the dash line, the alternate long and short dash line, the alternate long and two short dashes line, and the heavy line indicate the results in cases where the air retention time of the latter was longer than any of the formers. Specifically, the air retention time in the case indicated by the dash line was double the air retention time in the case indicated by the solid line. The air retention time in the case indicated by the alternate long and short dash line was three times the air retention time in the case indicated by the solid line. The air retention time in the case indicated by the alternate long and two short dashes line was five times the air retention time in the case indicated by the solid line. The air retention time in the case indicated by the heavy line was ten times the air retention time in the case indicated by the solid line. The air retention time in each case was obtained by dividing the cubic measure of the airflow path in the exhaust air duct 60 by the exhaust air volume per unit time achieved by operation of the exhaust fan 80. In FIG. 3, the y-axis indicates the amount of harmful matters that came into the cleaning filter 90 per unit time, and the x-axis indicates time. On the x-axis, the origin is the start time of operation of the fixing device 30. The results show that lengthening the air retention time, that is, increasing the cubic measure of the airflow path in the exhaust air duct 60 results in a reduction in the amount of harmful matters passing through the cleaning filter 90 per unit time. FIG. 3 shows that the temporal characteristic of the amount of harmful matters coming into the filter varies depending on the air retention time and that the longer the air retention time, the lower the peak value of the amount of harmful matters passing through the filter.

Figure 4:
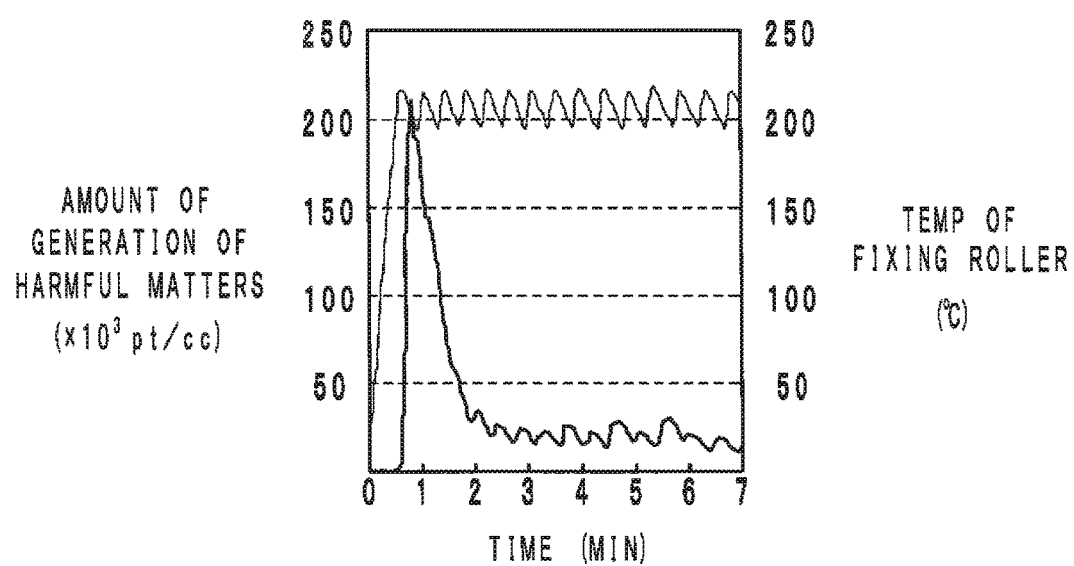
FIG. 4 is a graph indicating the relation between the amount of harmful matters generated from a fixing unit and elapse of time.

FIG. 4 is a graph indicating the relation between the amount of generation of harmful matters and time during a predetermined period of time from the start of operation of the fixing device 30. In FIG. 4, the y-axis indicates the amount of generation of harmful matters and the temperature of the fixing roller of the developing device 30, and the x-axis indicates time from the start of operation of the fixing device 30. The solid line indicates the amount of generation of harmful matters, and the fine line indicates the temperature of the fixing roller. As is clear from FIG. 4, the amount of generation of harmful matters is great especially during initial burst. However, the great amount of generation of harmful matters is seen only for a short time immediately after the start of heating, and the amount of generation of harmful matters during normal operation is small. Therefore, only by leveling the amount of harmful matters coming into the filter temporally, it becomes possible to reduce the peak value of the amount of discharge of harmful matters. Accordingly, increasing the cubic measure of the airflow path in the exhaust air duct 60 during initial burst is a very effective way to remove harmful matters.

Further, the airflow rate around the fixing device does not change even during initial burst, and the risk of leakage of harmful matters from the vicinity of the fixing device is reduced.

Additionally, switching the airflow path reduces the risk of problems caused by heating of the airflow path by exhaust heat from the fixing device.

Air passing through the air passage 62 and air passing through the air passage 64 join together at the junction 66 and are cleaned by the cleaning filter 90. Thus, a single filter is used to clean both the air passing through the air passage 62 and the air passing through the air passage 64. Therefore, the structure of the air cleaning system 50 of the image forming apparatus 1 contributes to downsizing of the apparatus and a reduction of the manufacturing cost.

First Modification; See FIG. 5

An image forming apparatus 1A according to a first modification is different from the image forming apparatus 1 in the structure of the exhaust air duct 60, in having additional two fans and in the position of the exhaust fan 80.

Figure 5:
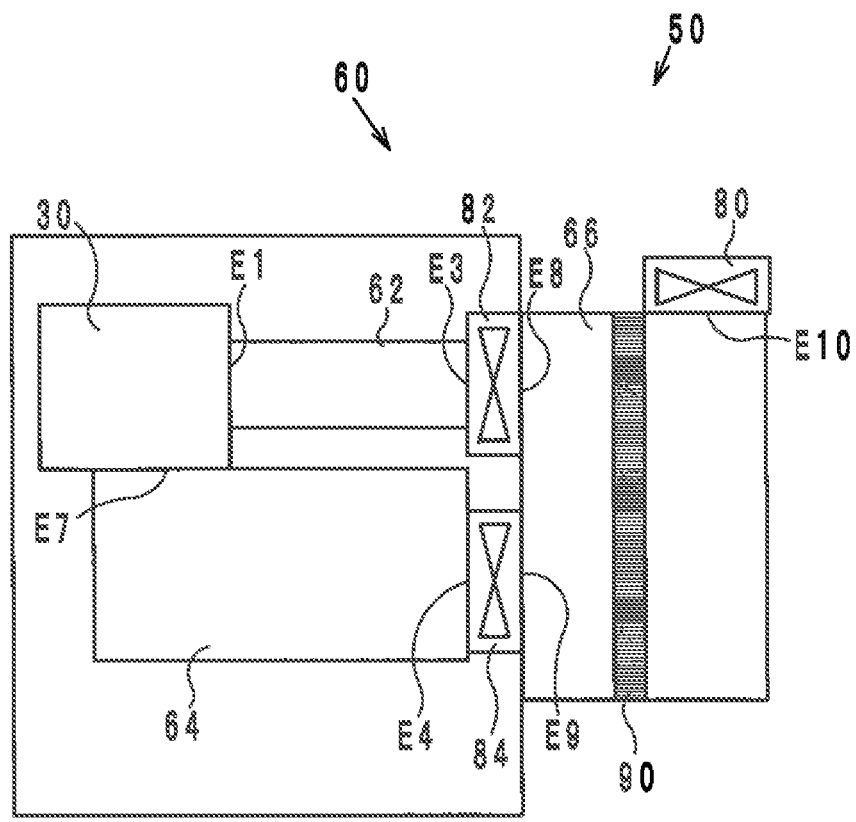
FIG. 5 is a schematic view of an air cleaning system according to a first modification.
Figure 5:
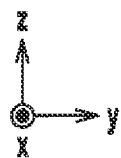

In the exhaust air duct 60 of the image forming apparatus 1A, as illustrated in FIG. 5, the air passage 62 and the air passage 64 are separated from each other. More specifically, in the image forming apparatus 1A, the opening E2 is not formed in the air passage 62, and the air passage 62 is not connected to the air passage 64. The cubic measure of the air passage 64 is greater than that of the air passage 62. The air passage 64 has not the opening E2 but an opening E7. The opening E7 is for direct intake of exhaust air from the fixing device 30 into the air passage 64 not via the air passage 62. Therefore, the opening E7 is formed near the fixing device 30. In the junction 66, an opening E8 for connection to the air passage 62 and an opening E9 for connection to the air passage 64 are formed.

In the image forming apparatus 1A, the exhaust fan 80 of the air cleaning system 50 is located on the upper outer surface of the exhaust air duct 60. The air cleaning system 50 of the image forming apparatus 1A includes fans 82 and 84 in addition to the exhaust fan 80. The fan 82 is provided between the air passage 62 and the junction 66. The fan 84 is provided between the air passage 64 and the junction 66.

In the air cleaning system 50 according to the first modification, while the airflow path from the fixing device 30 is switched by operations of the fans 82 and 84, the exhaust air from the fixing device 30 is cleaned. More specifically, during normal operation, the exhaust fan 80 and the fan 82 are activated. Thereby, the exhaust air from the fixing device 30 passes through the air passage 62 and is cleaned by the cleaning filter 90. Then, the cleaned air is discharged to the outside of the apparatus.

During initial burst, the exhaust fan 80 and the fan 84 are activated. Thereby, the exhaust air from the fixing device 30 passes through the air passage 64 and is cleaned by the cleaning filter 90. Then, the cleaned air is discharged to the outside of the apparatus. Since the cubic measure of the air passage 64 is greater than that of the air passage 62, the air retention time in the exhaust air duct 60 during initial burst is longer than the air retention time in the exhaust air duct 60 during normal operation. Accordingly, the trapping efficiency of the cleaning filter 90 during initial burst is higher than the trapping efficiency of the cleaning filter 90 during normal operation.

Second Modification; See FIG. 6

Figure 6:
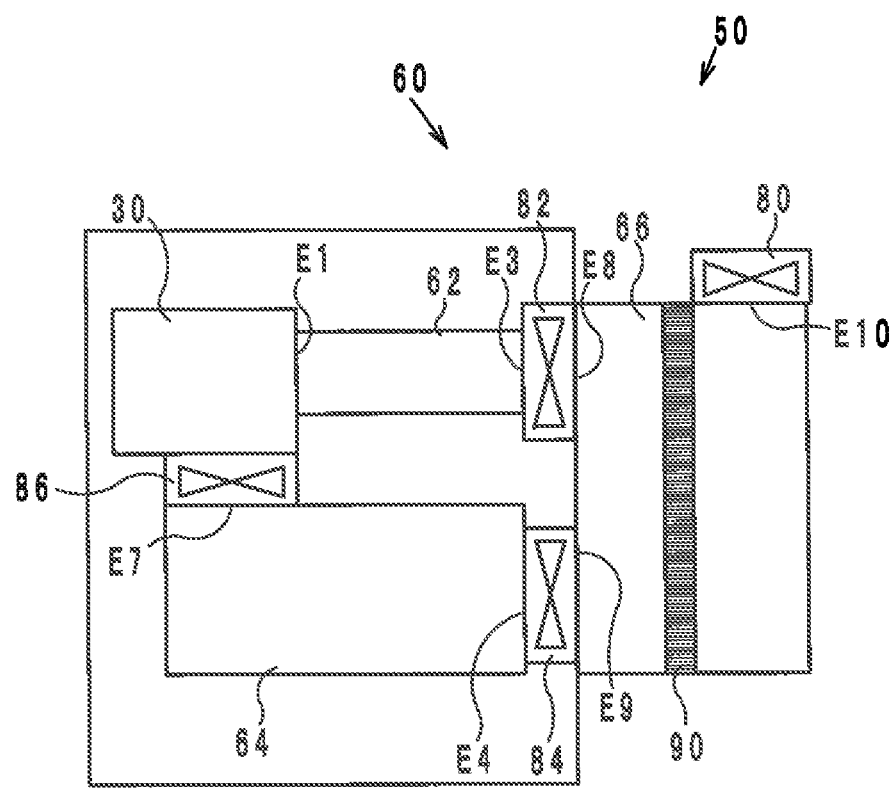
FIG. 6 is a schematic view of an air cleaning system according to a second modification.

An image forming apparatus 1B according to a second modification is different from the image forming apparatus 1A in having an additional fan 86 provided between the fixing device 30 and the air passage 64 as illustrated in FIG. 6. The fan 86 is activated substantially simultaneously with the fan 84 during initial burst. Activating the fan 86 provided between the fixing device 30 and the air passage 64 substantially simultaneously with the fan 84 ensures airflow from the fixing device 30 into the air passage 64.

The flow rate achieved by the fan 86 is lower than the flow rate achieved by the fan 84. Accordingly, the volume of air flowing into the air passage 64 never exceeds the volume of air flowing out of the air passage 64. This prevents excess air inflow to the air passage 64, and consequently, the air flowing into the air passage 64 is prevented from leaking out.

Third Modification; See FIGS. 7 and 8

An image forming apparatus 1C according to a third modification is different from the image forming apparatus 1A in the structure of the exhaust air duct 60, in having an additional on-off valve 70 and in the position of the fan 82.

In the exhaust air duct 60 according to the third modification, as illustrated in FIG. 7, a communicating passage 63 that is a hollow member is provided between the air passage 62 and the air passage 64. The air passage 62 and the air passage 64 are connected to each other via the communicating passage 63. The on-off valve 70 is provided at the connection between the air passage 62 and the communicating passage 63. According to the third modification, the air passage 64 has two openings. One of the openings is an opening E11 that is a connection portion to the communicating passage 63, and the other is the opening E4 that is a connection portion to the junction 66.

According to the third modification, the fan 82 is located near the opening E1 of the air passage 62, that is, at the inlet of the air passage 62 through which air flows from the fixing device 30 into the air passage 62.

In the air cleaning system 50 according to the third modification having the structure above, while the airflow path is controlled by operations of the exhaust fan 80, the fans 82 and 84, and the on-off valve 70, the exhaust air from the fixing device 30 is cleaned. Specifically, during normal operation, the exhaust fan 80 and the fan 82 are activated while the on-off valve 70 closes the connection portion between the air passage 62 and the communicating passage 63. Thereby, the exhaust air from the fixing device 30 comes to the cleaning filter 90 through the air passage 62 and is cleaned by the cleaning filter 90, and the cleaned air is discharged to the outside.

During initial burst, the on-off valve 70 opens the connection portion between the air passage 62 and the communicating passage 63. Accordingly, the part of the air passage 62 leading to the opening E3 is closed by the on-off valve 70. In this state, the exhaust fan 80, and the fans 82 and 84 are activated. Thereby, the exhaust air from the fixing device 30 comes to the cleaning filter 90 through a part of the air passage 62 and the air passage 64, and the air is cleaned by the cleaning filter 90 and discharged to the outside.

Figure 8:
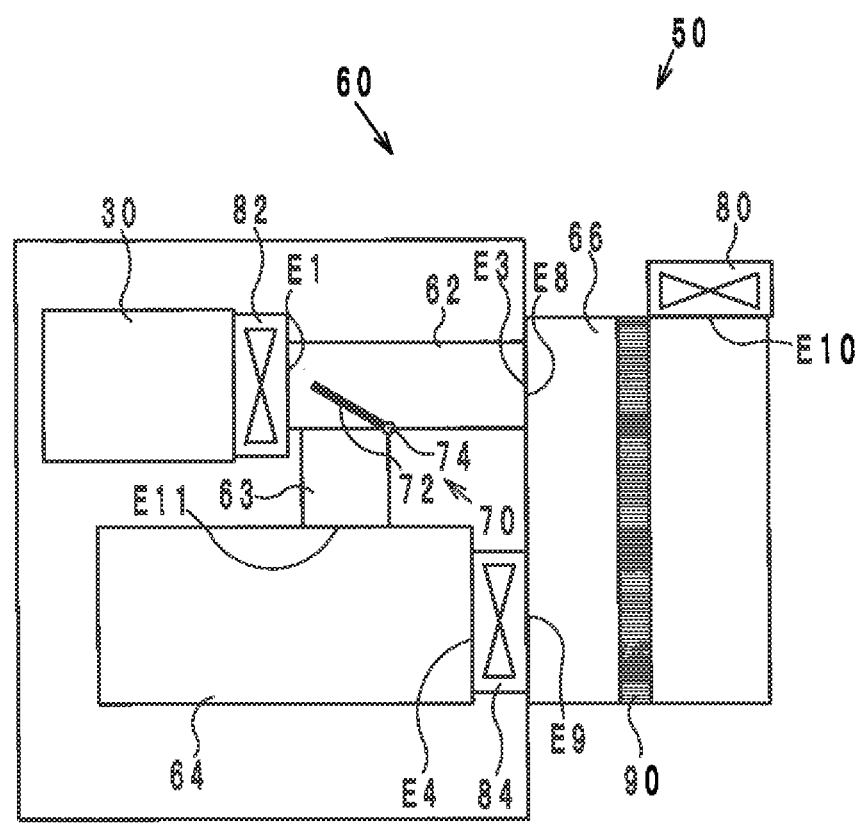
FIG. 8 is a schematic view of the air cleaning system according to the third modification, indicating a state of operation during initial burst.
Figure 8:
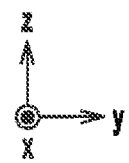

In the image forming apparatus 1C according to the third modification, during initial burst, the on-off valve 70 may be put partly open as illustrated in FIG. 8 so as not to completely close the part of the air passage 63 leading to the opening E3, thereby making it possible to use both the air passages 62 and 64. In this case also, the cubic measure of the airflow path during initial burst is greater than that during normal operation, and the air retention time in the exhaust air duct 60 during initial burst is longer than that during normal operation. Accordingly, the trapping efficiency of the cleaning filter 90 during initial burst is higher than that during normal operation.

Fourth Modification; See FIG. 9

An image forming apparatus 1D according to a fourth modification is different from the image forming apparatus 1 in the structure of the exhaust air duct 60 and the structure of the fans.

Figure 9:
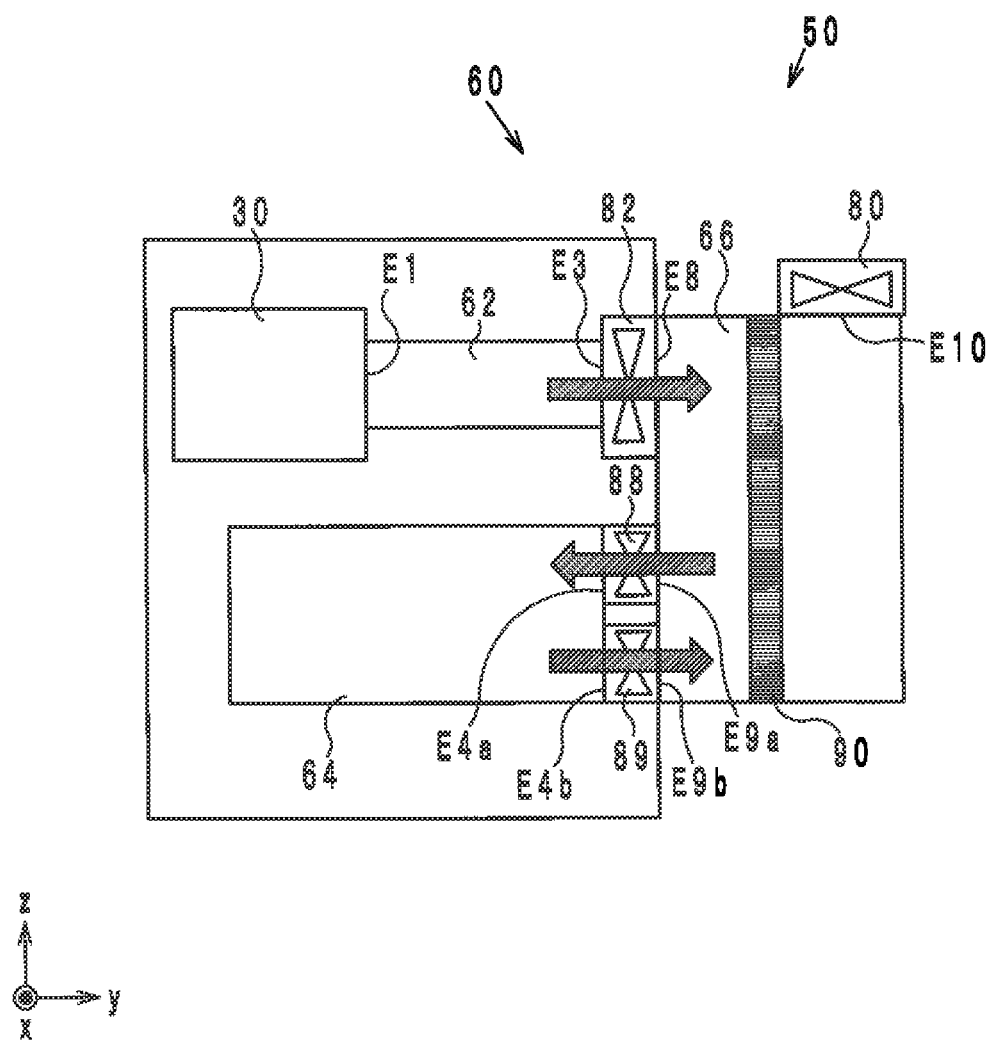
FIG. 9 is a schematic view of an air cleaning system according to a fourth modification.

In the exhaust air duct 60 according to the fourth modification, the air passage 62 and the air passage 64 are separated from each other as illustrated in FIG. 9. The air passage 64 has only two openings E4a and E4b at a connection portion to the junction 66. The openings E4a and E4b are arranged in this order from the side near the air passage 62. In the junction 66, openings E9a and E9b corresponding to the openings E4a and E4b respectively are made.

According to the fourth modification, the air cleaning system 50 includes fans 82, 88 and 89 in addition to the exhaust fan 80. The fan 82 is provided between the air passage 62 and the junction 66. The fans 88 and 89 are provided so as to face to the openings E4a and E4b respectively. The fan 88 creates airflow from the junction 66 to the air passage 64. The fan 89 creates airflow from the air passage 64 to the junction 66.

In the air cleaning system 50 according to the fourth modification having the structure above, while the airflow path is controlled by operations of the exhaust fan 80, and the fans 82, 88 and 89, the exhaust air from the fixing device 30 is cleaned. Specifically, during normal operation, the exhaust fan 80 and the fan 82 are activated. Thereby, the exhaust air from the fixing device 30 comes to the cleaning filter 90 through the air passage 62 and is cleaned by the cleaning filter 90, and the cleaned air is discharged to the outside.

During initial burst, the exhaust fan 80 and the fans 82, 88 and 89 are activated. Thereby, the exhaust air from the fixing device 30 flows into the junction 66 once through the air passage 62 by the operation of the fan 82. Thereafter, the air flows into the air passage 64 by the operation of the fan 88 and flows into the junction 66 again by the operation of the fan 89. Then, the air is cleaned by the cleaning filter 90, and the cleaned air is discharged to the outside. Thus, during initial burst, the air exhaust from the fixing device 30 passes through the air passages 62 and 64. Therefore, the air retention time in the exhaust air duct 60 during initial burst is longer than that during normal operation. Accordingly, the trapping efficiency of the cleaning filter 90 during initial burst is higher than that during normal operation.

Other Embodiments

Image forming apparatuses according to the present invention are not limited to the embodiments and the modifications described above. For example, the number of air passages and the detailed shapes of the air passages may be determined arbitrarily. A sensor or the like may be provided in the air passage 62 so that the airflow path can be switched in accordance with the density of harmful matters, thereby making it possible to change the trapping efficiency of the cleaning filter 90 also at other times as well as the time of initial burst. Further, the embodiments and the modifications described above may be combined.

Although the present invention has been described in connection with the preferred embodiments above, it is to be noted that various changes and modifications may be obvious to those who are skilled in the art. Such changes and modifications are to be understood as being within the scope of the present invention.

What is claimed is:

1. An image forming apparatus having a function to clean exhaust air from inside of the image forming apparatus and to discharge cleaned air, the image forming apparatus comprising:
    an exhaust air duct configured to guide internal air to outside of the image forming apparatus; and
    a cleaning filter configured to clean air passing through the exhaust air duct; and
    a fixing device;
    wherein a cubic measure of a first airflow path utilized in the exhaust air duct during a first operational mode has a first value;
    a cubic measure of a second airflow path utilized in the exhaust air duct during a second operational mode has a second value greater than the first value;
    the exhaust air duct includes a first air passage and a second air passage;
    the first value of the cubic measure of the first airflow path is equal to a cubic measure of the first air passage;
    the second value of the cubic measure of the second airflow path is equal to a cubic measure of the second air passage;
    a first fan is provided in the first air passage;
    a second fan is provided in the second air passage;
    a third fan is provided between the fixing device and the second air passage; and
    while the second air passage is used, an airflow rate achieved by the second fan is greater than an airflow rate achieved by the third fan.

2. The image forming apparatus according to claim 1, wherein:
    the exhaust air duct includes a junction where an end of the first air passage and an end of the second air passage are connected.

3. The image forming apparatus according to claim 1, wherein the second operational mode is conducted during a heating operation of the fixing device.

4. The image forming apparatus according to claim 1, further comprising a junction in which an end of the first airflow path and an end of the second airflow path are connected, wherein the cleaning filter is disposed in the junction.

* * * * *